United States Patent [19]
Kusmer

[11] Patent Number: 5,588,737
[45] Date of Patent: Dec. 31, 1996

[54] MODULAR RECESSED LIGHTING SYSTEM

[75] Inventor: Raymond J. Kusmer, Yorba Linda, Calif.

[73] Assignee: Thomas Industries, Inc., Los Angeles, Calif.

[21] Appl. No.: 339,193

[22] Filed: Nov. 10, 1994

[51] Int. Cl.$^6$ .......................................... F21S 1/02
[52] U.S. Cl. .................... 362/148; 362/365; 362/370; 248/343; 174/65 R; 174/67
[58] Field of Search ................ 174/48–50, 52.1, 174/65 R, 66, 67, DIG. 2; 248/342, 343, 906; 362/147, 148, 364, 365, 366, 374, 368, 370

[56] References Cited

U.S. PATENT DOCUMENTS

| | | | |
|---|---|---|---|
| 3,783,176 | 1/1974 | Lund et al. | 174/65 R |
| 4,000,406 | 12/1976 | Bhavsar | 174/DIG. 2 |
| 4,041,657 | 8/1977 | Schuplin | 248/343 |
| 4,293,895 | 10/1981 | Kristofek | 362/364 |
| 4,459,429 | 7/1984 | Docimo | 174/65 R |
| 4,713,916 | 12/1987 | Brooks, Jr. | 362/364 |
| 4,829,410 | 5/1989 | Patel | 362/147 |
| 4,910,651 | 3/1990 | Montanez | 362/148 |
| 5,031,084 | 7/1991 | Russo et al. | 362/365 |
| 5,045,985 | 9/1991 | Russo et al. | 362/366 |
| 5,057,979 | 10/1991 | Carson et al. | 362/147 |
| 5,075,831 | 12/1991 | Stringer et al. | 362/365 |
| 5,124,901 | 6/1992 | Sojka et al. | 362/366 |
| 5,410,462 | 4/1995 | Wolfe | 362/365 |
| 5,452,193 | 9/1995 | Hinnefeld et al. | 362/366 |
| 5,465,199 | 11/1995 | Bray et al. | 362/364 |

*Primary Examiner*—Ira S. Lazarus
*Assistant Examiner*—Alan B. Cariaso
*Attorney, Agent, or Firm*—Hill, Steadman & Simpson

[57] ABSTRACT

A recessed light fixture includes a neuter plaster frame with which is attached components to customize the fixture to specific installations. The components include a junction box with a face plate attachable thereto that has different electrical elements mounted thereon, such as transformer and thermal protectors, a ballast mounting plate that fastens onto the plaster frame by an arrangement of legs and spring clips, and a trim ring that accommodates to the thickness of the ceiling. The bulb socket is held in a socket cup that is fitted with different socket holders depending on the size and shape of the socket, and the hanger bars for the supporting the plaster frame in the ceiling are adaptable for mounting on wood joists or metal suspended ceiling grids.

16 Claims, 5 Drawing Sheets

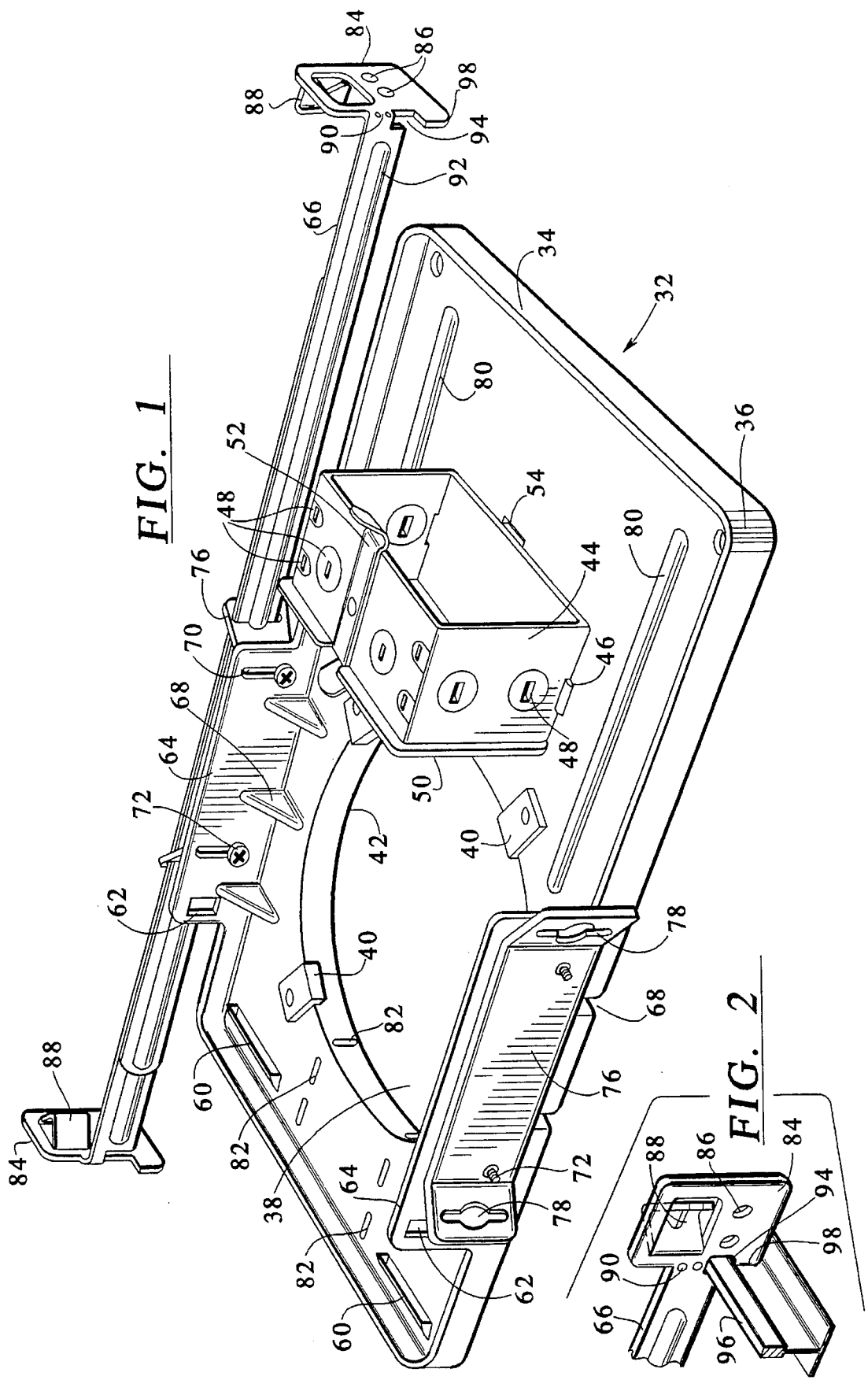

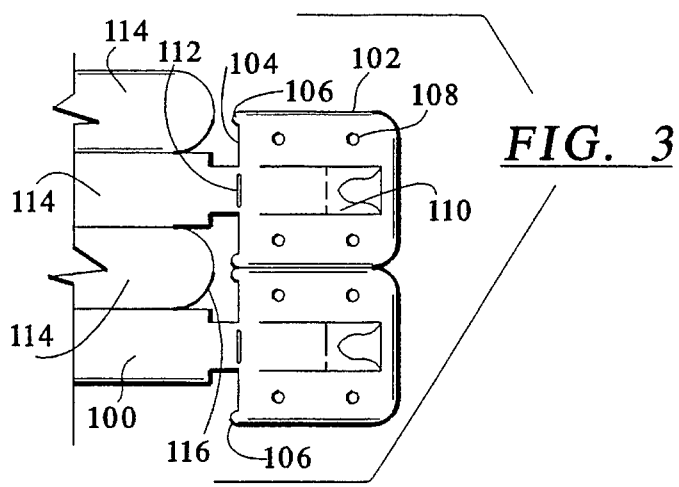
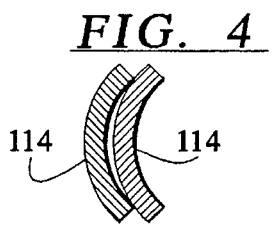
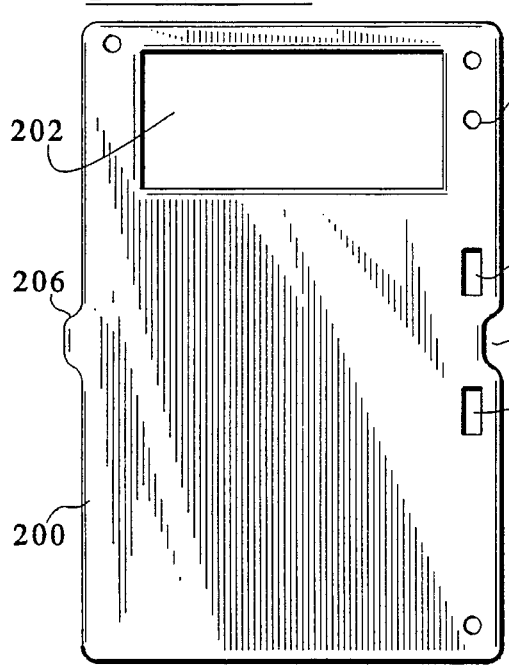
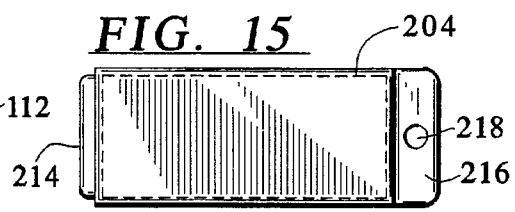
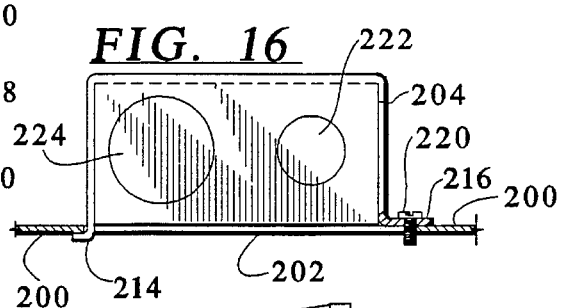
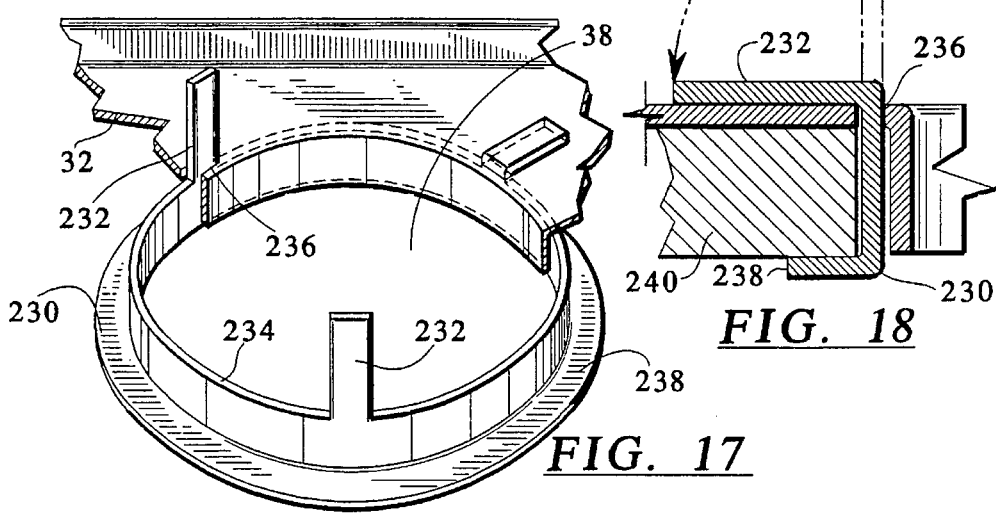

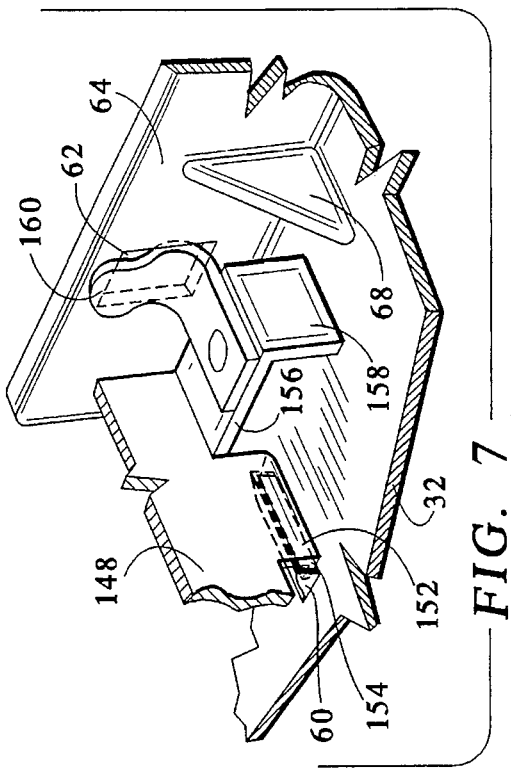
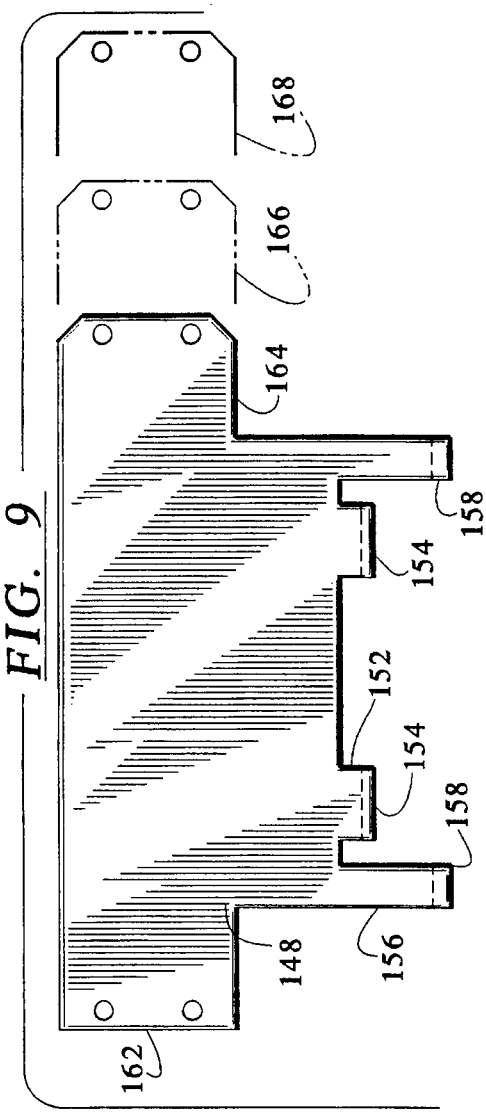
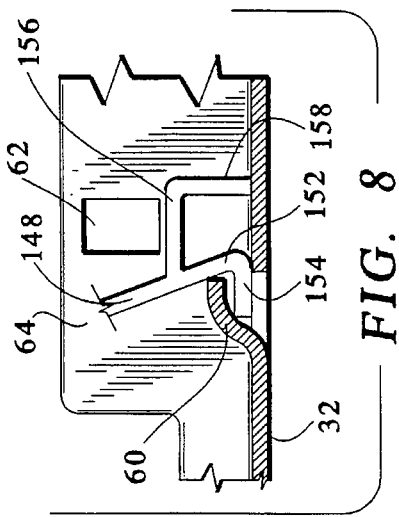
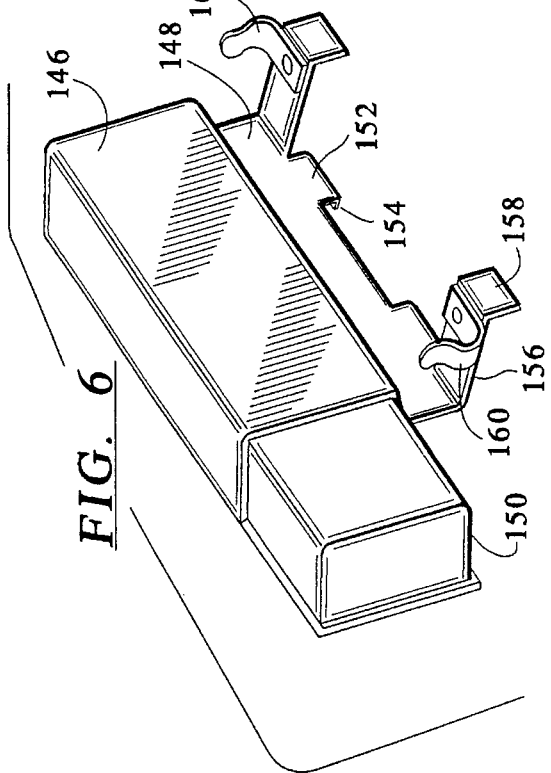

MODULAR RECESSED LIGHTING SYSTEM

BACKGROUND OF THE INVENTION

1. Field of the Invention

The present invention relates generally to a system of interchangeable components for a recessed lighting installation, and in particular the invention provides a plurality of modular components that may be fit together for a recessed light installation.

2. Description of the Related Art

Recessed lighting, in which the light bulb or other light source is recessed into a surface such as a ceiling or wall of a building or room, generally requires a fixture mounted above, or "within", the ceiling for supporting the bulb, bulb socket, reflector, junction box, and other components. This supporting fixture may be in the form of a so-called plaster frame, and is generally attached to the structural elements of the building, for example, the ceiling joists.

These known light fixtures and plaster frames are specifically formed and shaped for each different type of installation. For example, one type of fixture is dedicated to mounting the light between wooden ceiling joists above a plasterboard ceiling, while another type of fixture is dedicated to mounting the light above a suspended ceiling having a framework of metal channels holding ceiling tiles. One type of fixture is required for incandescent light installations, another for low voltage lights, yet another for compact fluorescent lamps, and yet a further for high intensity discharge lamps. Different spacings between joists, different thickness ceiling panels, and different electrical considerations for each installation also must be considered.

The result of so many variables is that many different dedicated light fixtures must be manufactured and stocked as inventory. The proper configuration must be ordered and delivered to the work site for work to proceed. A shortage of one type may delay an entire construction project, or at least cause a change to a different type of light installation. Costs are therefore high due to storage and specialized manufacturing of multiple dedicated units.

SUMMARY OF THE INVENTION

An object of the present invention is to provide a modular lighting system having interchangeable parts to accommodate many different installation situations.

A further object of the invention is to provide a neuter frame for a light fixture that can be equipped with modular components specific to its installation.

Another object is to provide an adjustable recessed light assembly that adapts to many different installations.

These and other objects and advantages of the invention are provided by a recessed lighting plaster frame having snap-on ballasts, interchangeable light socket cups, interchangeable junction box elements, universal hanger bars, and universal trim rings. In particular, the plaster frame is without specific features dedicating it to any particular installation but has means for attaching the various elements or otherwise modifying the frame for specific installations. The present plaster frame may, therefore, be described as a neuter frame. The frame is inexpensively formed of sheet metal.

Means for snap-on attachment of ballasts or other electrical components are provided. A preferred embodiment of the snap-on attachment requires little modification of the plaster frame, in particular, only requiring punch out of the attachment locations on the sheet metal plaster frame without the attachment of additional parts. The cooperating element of the ballast or other component is likewise simple in construction and inexpensively formed. These two parts are easily attached together with a simple movement, and are also easily disassembled when required.

Universal hanger bars which support the plaster frame by being affixed to ceiling joists or grid elements of suspended ceilings are provided. The hanger bars extend through support channels that are adjustable to accommodate different height installations. The hanger bars are also extendable in length and may be nailed to joists either endwise or lengthwise. The hanger bars may be modified without tools to fit either the grid frame of a suspended ceiling or nailed to wooden joists. In a preferred embodiment, the hanger bars are symmetrical to avoid the need for right and left hanger bars and enable their use on either side of the plaster frame. The hanger bars of the invention are formed inexpensively of sheet metal.

BRIEF DESCRIPTION OF THE DRAWINGS

FIG. 1 is a perspective view of a plaster frame with components mounted thereon in accordance with the principles of the present invention;

FIG. 2 is a fragmentary view of an end of a hanger bar being mounted on a T-bar of a suspended ceiling according to the present invention;

FIG. 3 is a fragmentary plan view of ends of symmetrical hanger bars;

FIG. 4 is a cross section of the shafts of two hanger bars adjacent one another;

FIG. 6 is a perspective view of a second embodiment of a ballast mounting means;

FIG. 7 is an enlarged fragmentary perspective view of mounting legs of a ballast mounting means attached to the plaster frame;

FIG. 8 is an enlarged elevational cross section showing the relationship between the ballast mounting means and the attachment locations on the plaster frame;

FIG. 9 is a plan view of a ballast mounting plate, including different sizes of the plate being indicated in phantom;

FIG. 14 is a plan view of another embodiment of a junction box plate;

FIG. 15 is a plane view of an auxiliary junction box for mounting on the junction box plate of FIG. 14;

FIG. 16 is a side elevational view of the auxiliary junction box of FIG. 15;

FIG. 17 is a perspective view, partially broken away, of a trim ring in the plaster frame of the present invention;

FIG. 18 is an enlarged cross section of the trim ring of FIG. 17 mounted in the plaster ring;

DETAILED DESCRIPTION OF THE PREFERRED EMBODIMENTS

Figure 5:
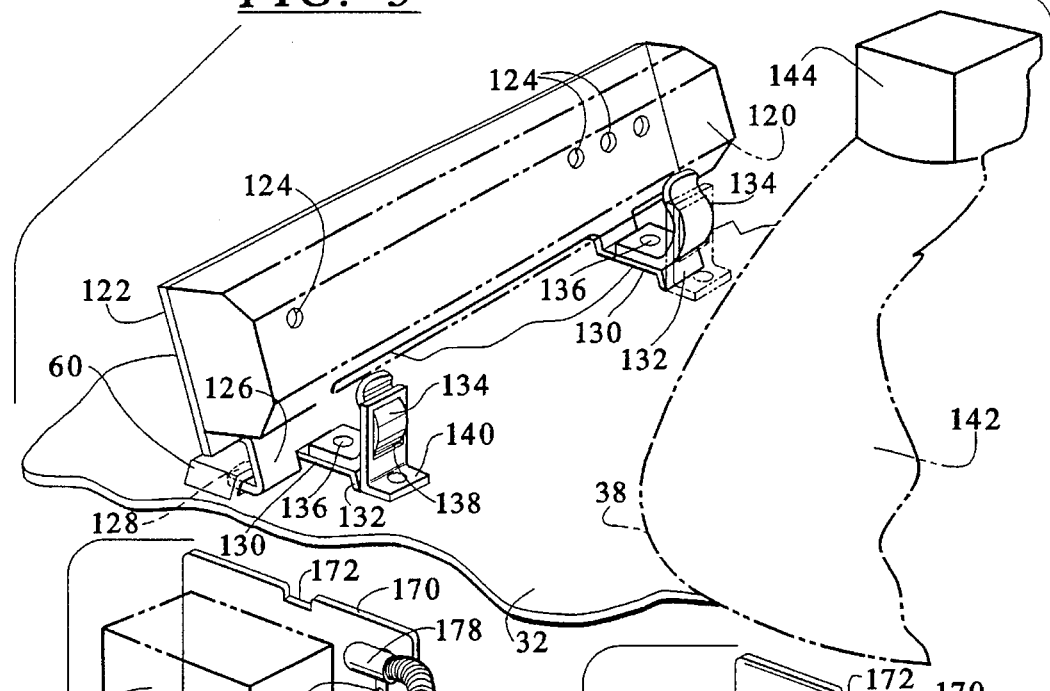
FIG. 5 is a fragmentary perspective view, partially in phantom, of a ballast being mounted on the plaster frame.

In FIG. 1, a plaster frame 32 is formed from a single sheet of metal. The plaster frame 32 is generally planar and rectangular in shape with a raised lip or edge 34 about its periphery including at corners 36. The raised lip 34 may alternately extend only at the straight portions of the periphery of the frame 32 so that the corners are open (not shown). This avoids the crimping at the corners 36, but also has the effect of weakening the frame 32 somewhat.

A reflector opening 38 in the frame 32, shown here as a circular opening, is provided to accommodate a reflector (to be shown later) of the recessed lighting installation. The reflector is to be mounted in the opening 38 to direct light downward relative to the figure, and is held in place in the frame 32 by tension springs 40 that are attached to the frame 32 at locations about the opening 38. The reflector opening 38 has a downwardly directed lip 42 surrounding the opening.

On the top surface of the frame 32 is mounted a junction box 44. The junction box 44 is attached to the frame 32 by tabs 46 at the ends of the box 44 that are inserted into slots in the frame 32 and bent. As is known, the junction box 44 includes punch outs 48 that are selectively removable by the electrician so that wiring, conduit connectors, or the like may be passed therethrough. The front and back of the junction box 44 is open and plates may be attached to close the junction box 44. In FIG. 1, one such plate 50 is at the rear of the junction box 44 and the front is open. The plates 50 are selectively connectable in place by a spring clip 52 on the top of the box 44 that has opposite ends with finger tabs that enable the spring ends to be lifted for removal of the plate 50. The lower edge of the plates 50 have a tab which fits into a slot 54 on the frame 32. The plates 50 may contain various electrical components, as will be described in greater detail hereinafter.

At the end of the plaster frame 32 opposite the junction box 44 is an attachment means for additional components, such as electrical components. The attachment means includes a pair of raised scoop-shaped, or louvre-shaped, portions 60 formed in the surface of the frame 32 and a pair of openings 62 in upwardly extending portions 64 of the raised lip 34. The attachment of the components at these locations will be described later.

The upwardly extending portions 64 are on opposite sides of the plaster frame 32 on either side of the reflector opening 38 for connection to hanger bars 66. In particular, the upwardly extending portions 64 are at right angles to the planar body of the plaster frame 32 and is supported by ribs 68. A pair of vertical slots 70 in the upwardly extending portions 64 accept screws 72 that are selectively movable therein. The screws 72 threadably engage into hanger support plates 76 through which the hanger bars 66 extend. The hanger support plates 76 are angled at the ends and have shaped openings 78. The openings 78 are shaped to accept the hanger bars 66 in either of two orientations, with a raise portion directed toward the body of the frame 32 or directed away. This provides versatility in installation of the present light fixture, as the hanger bars 66 may be inserted with end mounting portions facing either direction.

On the plate which forms the body of the plaster frame 32 is a pair or ribs 80 which strengthen the sheet metal body. A series of break-away holes 82 are formed in the plaster frame 32. The metal of the plaster frame 32 can be broken at the holes 82 to make an opening to the reflector opening 38 that permits the plaster frame 32 to be inserted through an opening in the ceiling through which the light will be directed.

The hanger bars 66 of the present invention, one pair of which is shown in FIG. 1, are used generally two pairs at a time, one pair supporting each side of the plaster frame 32. The hanger bars 66 each have end mounting plates 84 for mounting the hanger bars 66 to ceiling joists, for example. In the embodiment illustrated in FIG. 1, a pair of holes 86 are provided for nails or other fasteners to affix the hanger bar 66 to a ceiling joist with its end abutted against the joist. A nail tab 88 is provided bent out from the plane of the end mounting plate 84 for nailing to a joist that extends generally parallel to the hanger bar 66. Perforations 90 are provided at the bend between the end mounting plate 84 and a shaft 92 of the hanger bar 66. The perforations 90 weaken the bend to enable the hanger bar 66 to be bent to a straight position, as shown in FIG. 2. A clearance 94 is also provided at the bend.

Referring to FIG. 2, the hanger bars 66 of the present invention may be mounted on a grid member 96 of a suspended ceiling, such a the T-bar grid member shown in FIG. 2. To mount the hanger bar 66 on the grid member 96, the clearance 94 is placed over the enlarged top edge of the grid member 96 and the end mounting plate 84 is bent at the perforations 90 to a position generally straight relative to the shaft 92 of the hanger bars 66. An extension 98 is then positioned under the enlarged top edge to hold the hanger bar 66 to the grid member 96.

A preferred embodiment of the hanger bars that are symmetrical is shown in FIG. 3. The hanger bars 66 shown in FIGS. 1 and 2 must be placed into the hanger support plates 76 in a position with the clearance 94 directed downward if the hanger bar 66 is to be mounted on a grid member 96. An installer must take care to insert the hanger bar 66 in the proper orientation, or else the installer may be required to remove and re-orient the hanger bar 66. Further, the hanger bars 66 generally are supplied with the end mounting plates 84 pre-bent into the position shown in FIG. 1. As such, right and left hanger bars 66 must be matched. The symmetrical hanger bar 100 shown in FIG. 3 avoids these problems by providing a hanger bar 100 having an end mounting plate 102 that has a clearance 104 and an extension 106 on each side. The hanger bar 100 may be used in either orientation with either side up for mounting over a grid member of a suspended ceiling. The nail holes 108 are also provided on each side of the end mounting plate 102, with the nail tab 110 in the middle. The preferred embodiment has a small slot 112 to weaken the bending location in place of the holes 90 of the embodiment of FIG. 2.

As manufacturing consideration, the preferred hanger bars 100 may be formed by being cut or punched from a sheet of metal. An arrangement of the preferred hanger bars wherein shafts 114 of the hanger bars 100 are arranged side-by-side and the end mounting plates 102 are alternately positioned opposite one another, thereby providing optimum use of material with little waste, as shown in FIG. 3. An end 116 of one hanger bar shaft 114 lies between two adjacent end mounting plates 102. The shafts 114 and the end mounting plates 102 are proportioned so that the end mounting plates 102 are separated only by a distance sufficient to ensure separation of the hanger bars 100 from one another.

In FIG. 4 is shown a cross section of the shafts 114 of two of the preferred hanger bars 100 positioned adjacent one another. In cross section, the shafts 114 are shaped in a curve, such as a curve of generally constant radius, and so may be nested together, as shown. The curved shafts 114 simplify formation of the hanger bars as well.

The recessed light installation may require a ballast for proper lamp operation, and so the present modular recessed light system provides a ballast mounting that is quickly and easily installed on the plaster frame 32. In FIG. 5, a ballast housing 120 is being mounted on the plaster frame 32. The ballast housing 120, which may be different for each type and make of lamp, is mounted on a ballast mounting plate 122 of the present invention, for example by mounting holes 124 in the plate 122. The plate 122 has a mounting leg 126 at either end of the lower side with a rearwardly facing tab 128 on the mounting leg 126 bent at an angle of, preferably, slightly less than 90°. The tab 128 fits into the scoop-shaped portions 60 on the plaster frame 32. The mounting plate 122 also has a second mounting leg 130 on either end of the lower side adjacent the first mounting leg 126. The second mounting leg 130 is bent forward, or opposite the tab 128, and then bent downward at a tab 132. The free end of the tab 132 on the second leg 130 bears against the surface of the plaster frame 32 when the tab 128 is in the scoop-shaped portion 60.

A spring clip 134 is attached to the second leg 130, on the top surface thereof, by a rivet 136, for example. The spring clip engages into an opening 138 to hold the ballast 120 in place on the plaster frame 32. In the embodiment illustrated in FIG. 5, the spring clip 134 faces forward, or the same direction as the second leg 130, and clips into the opening 138 provided in an upwardly extending member 140 attached to the plaster frame 32.

A reflector 142 for the lamp is shown in phantom on the plaster frame 32 mounted in the reflector opening 38. Atop the reflector 122 is a socket cup 144 in which a socket for the light bulb is housed.

A second embodiment of the ballast mounting means is shown in FIG. 6. A ballast housing 146 is mounted on a mounting plate 148. At one end of the ballast housing 146 is connected a small junction box 150 for enclosing electrical connections to the ballast. The small junction box 150 is supported on an extension of the mounting plate 148. In this embodiment, the first mounting legs 152 with the rearwardly directed tabs 154 are spaced inwardly from the ends of the lower side of the mounting plate 148 so that the second mounting legs 156 are disposed at the ends thereof. The second mounting legs 156 are bent forwardly and have downwardly bent tabs 158 at the free ends just as in the previous embodiment. However, the spring clips 160 that are attached on each of the second mounting legs 156 faces sidewardly.

In FIG. 7, the first mounting leg 152 of the ballast mounting plate 148 is positioned on the surface of the plaster frame 32 with the tab 154 extending into the scoop-shaped members 60. The second leg 156 has its tab 158 bearing against the surface of the plaster frame 32, and the spring clip 160 extends into the opening 62 in the upwardly extending portions 64. By comparing FIGS. 1, 6 and 7, it can be seen that the spring clips 160 are on both ends of the ballast mounting plate 148 and so engage into both openings 62 on the upwardly extending portions 64 at opposite sides of the plaster frame 32 while the tabs 154 extend into the scoop-shaped portions 60 on the plaster frame 32. The ballast mounting plate 148 is thereby held in place on the plaster frame. The spring clips 160, which are of spring steel, for example, and flex for engagement into the openings 62. The spring clips 160 may also be selectively disengaged from the openings 62 to permit removal of the ballast mounting plate 148 from the plaster frame 32.

FIG. 8 illustrates the relative positions of the scoop-shaped member 60, the opening 62 into which the spring clip 62 engages, and the mounting legs 152 and 156 of the mounting plate 148. The ballast mounting plate 148 is mounted by simultaneously rotating the plate 148 in a clock-wise direction relative to the FIG. 8 while inserting the tab 154 on the first leg 152 into the scoop-shaped member 60. The clock-wise rotation brings the second leg 156 to bear against the surface of the plaster frame 32 and permits the spring clip (not shown in this figure) on the top of the second leg 156 into engagement in the opening 62.

In FIG. 9, the ballast mounting plate 148 is shown prior to being bent into shape. The first and second mounting legs 152 and 156 may be seen at the lower edge of the plate 148. The plate 148 may be of any shape as needed to support ballasts or other devices which may be mounted thereto. The left end 162 of the mounting plate 148 extends beyond the second leg 156 at the left side, with respect to FIG. 9, of the mounting plate 148 to support a junction box 150 as shown in FIG. 6. The right end 164 of the plate 148 supports the ballast housing 146. Since the ballast housings may vary from one model to another, various sizes of ballast mounting plates 148 are provided to mount each size ballast. For example, a short ballast would be mounted on the plate 148 at the end 164 in FIG. 9, while a middle length ballast would be mounted on a plate having a right end 166 extending further, and a long ballast housing would be mounted on a plate having a long extension 168 at its right side, as indicated in phantom in FIG. 9. The adaptability of the attachment means disclosed here for ballasts permits other components as needed to be mounted on the plaster frame. Accordingly, the present invention is not limited to mounting ballast with this mounting arrangement, but many other components may be mounted this way as well.

Figure 10:
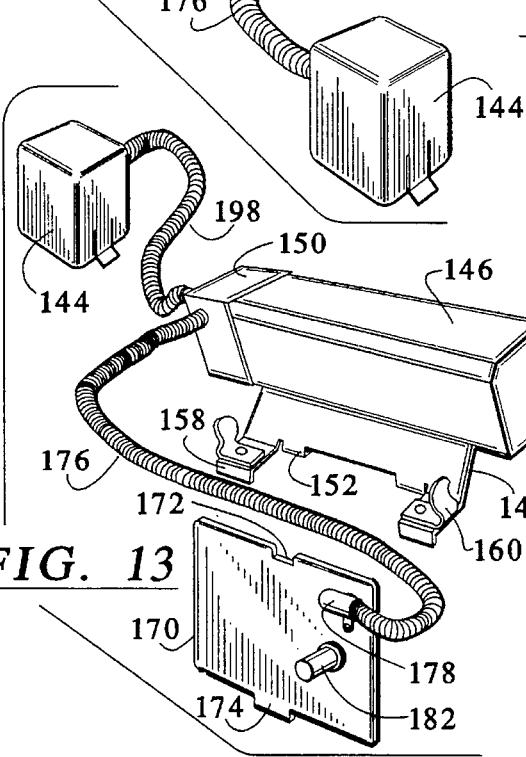
FIG. 10 is a perspective view of a junction box plate configured for operation with an incandescent lamp.

The present invention provides a junction box which is readily adapted for different installations. The junction box 44 shown in FIG. 1 includes the spring clips 52 and the slots 54 by which different front and back plates may be mounted on the junction box. An example of one such plate is shown in FIG. 10, wherein a plate 170 has an indent 172 at a top edge into which the spring clip 52 of the junction box 44 fits. A tab 174 at a lower edge of the plate 170 fits into the slot 54 in the plaster frame 32 to hold the plate 170 onto the junction box 44. The embodiment of the plate 170 of FIG. 10 is connected to the socket cup 144 (previously shown in FIG. 5) by a flexible conduit 176. The conduit 176 is connected to the plate 170 by a connector 178 that attaches to the plate by a single screw 180 to cover an opening in the plate through which electrical wiring passes. A thermal protector 182 is also mounted on the plate 170. The arrangement of the plate 170 shown in FIG. 10 is used for incandescent lamp installations. Depending on the power supply available, a transformer 184 may be required, as shown in phantom. The transformer is attached to the plate 170 as well.

Figure 11:
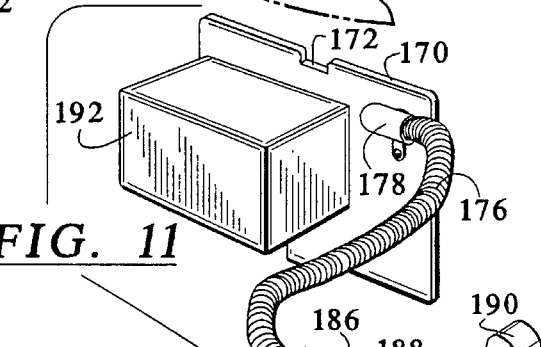
FIG. 11 is a perspective view of the junction box plate configured for operation with a low voltage lamp.

A low voltage lamp may be used in the present recess lighting assembly, in which case the plate 170 is configured as shown in FIG. 11. The conduit 176 is connected to the plate 170 by the connector 178. At the other end of the conduit 176 is shown a spring connector 186 that holds the conduit in the appropriate socket cup. The electrical wiring 188 extends from the conduit 176 to a socket 190. A transformer 192 is mounted on the plate 170 to provide the voltage required for the low voltage lamp. It may be noted that the plates 170 of FIGS. 10 and 11 are the same, only the connections to the plate 170 vary. According to the invention, one plate having different piercings may be adapted to different installations.

Figure 12:
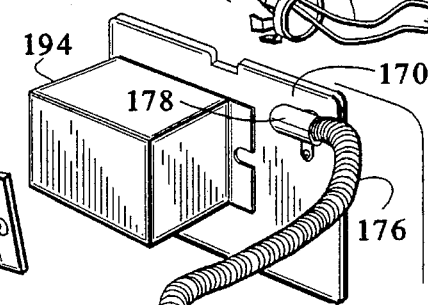
FIG. 12 is a perspective view of the junction box plate configured for operation with a compact fluorescent lamp.

Referring now to FIG. 12, the plate 170 is modified for a compact fluorescent lamp installation, including a ballast 194 attached thereto, which includes a thermal protector, and a socket cup 196 for the fluorescent lamps. The conduit 176 and the connector 178 are the same as in the previous installations.

Figure 13:
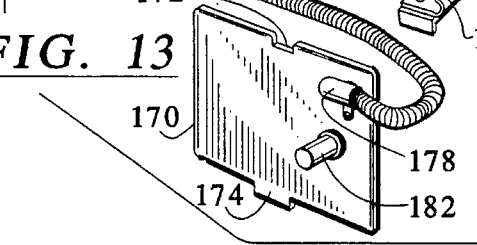
FIG. 13 is a perspective view of the junction box attached to a ballast for operation with a high intensity discharge lamp.

FIG. 13, the plate 170 has the thermal protection device 182 mounted at one piercing and the connector 178 for the conduit 176 mounted at another piercing, or opening. The conduit 176 extends to the small junction box 150 at the end of the ballast housing 146. The ballast housing 146 is on the mounting plate 148 as described above for attachment to the plaster frame 32. A second conduit 198 extends between the small junction box 150 and the socket cup 144. The arrangement shown in this figure is for use with, for example, a high intensity discharge lamp.

A modification of a junction box plate 200 is shown in FIG. 14 which includes an opening 202 for an auxiliary junction box 204, as shown in FIGS. 15 and 16. The plate 200 has a tab 206 that fits into the slot 54 on the plaster frame 32 and a recess 208 for accepting the spring clip 52, as previously described. A pair of positioning slots 210 are on the plate 200. The auxiliary junction box 204 is attached at an attachment hole 212.

In FIG. 15, the auxiliary junction box 204 has a tab 214 that extends into the opening 202 at a side opposite the attachment hole 212. The body of the box 204 is wider than the opening 202 so that the sides of the box 204 are prevented from passing through the opening 202. At the end opposite the tab 214, an attachment flange 216 with a hole 218.

In the side view of FIG. 16, the auxiliary junction box 204 is attached at the opening 202 by having the tab 214, which extends lower than the sides of the box 204, through the opening 202 and a screw 220 extending through the hole 218 in the flange 216 and into the attachment hole 112. The auxiliary junction box 204 has a first punch-out 222 for the connector 178 at the end of the flexible conduit and a second punch-out 224 for the thermal protector 182. The plate 200 and the auxiliary junction box 204 are shaped such that the plate can be reversed with the opening 202 on either end and the auxiliary junction box 204 can be mounted thereon. This arrangement thereby provides many different mounting options.

FIG. 17 shows a trim ring 230 for use with the present modular lighting system. The trim ring 230 has a plurality, in this case three, upwardly extending extensions 232 extending from the cylindrical portion 234 of the trim ring 230. The plaster frame 32 has a like arrangement of slots 236 through which the extensions are inserted.

The trim ring 230 has a flange 238 that shields the edges of the hole cut in the ceiling 240 from view. Some ceilings are thicker than others and ordinarily require trim rings shaped for the ceiling thickness. The present trim ring 230 can be adapted for different thickness of ceilings 240. In particular, as shown in FIG. 18, the trim ring 230 is pressed upward so that the flange 238 bears against the lower surface of the ceiling 240. The portions of the extensions 232 that extend through the slot 236 are bent over away from the opening 38 in the plaster frame 32, thereby holding the trim ring 230 in place and securing the plaster frame 32 against the ceiling 240.

Figure 19:
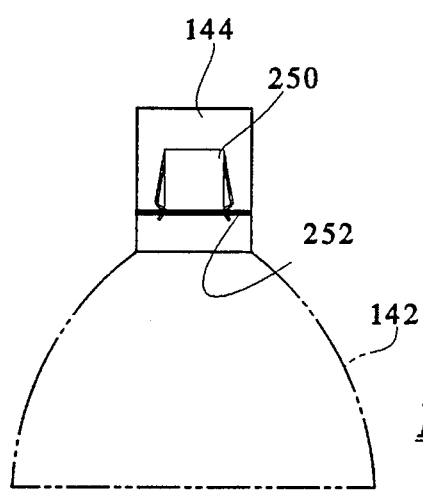
FIG. 19 is an elevational cross section of a socket cup on a reflector for the present recessed lighting assembly.

FIG. 19 shows a socket cup 144 mounted on top of a reflector 142 for a recess light installation. The socket cup 144 contains a socket holder 250 holds the lamp socket for the light bulb. The socket holder 250 is supported on a socket plate 252 in the socket cup 144.

Figure 20:
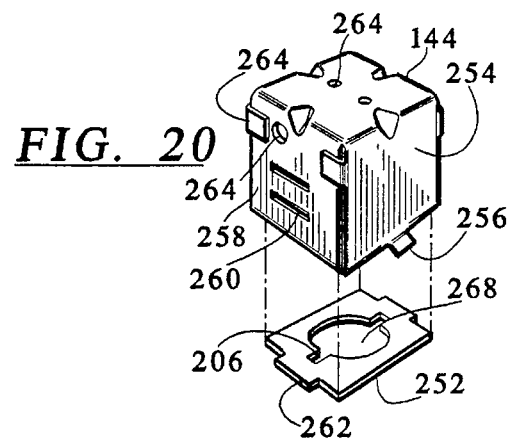
FIG. 20 is a perspective view of a first embodiment of a socket cup of the present invention.

FIG. 20 illustrates an adjustable socket cup 144 of the invention into which fits the socket plate 252. The socket cup 144 has one pair of opposed side panels 254 that each have a lower attachment tab 256 that fits into the top of the reflector 142. The other pair of side panels 258 includes a plurality of slots 260 that are parallel to the bottom surface of the socket cup 144. The socket plate 252 has tabs 262 on opposite ends thereof which fit into the slots 260. The socket plate 252 may be held at a plurality of positions, corresponding to the plurality of slots 260 in the side panels 258. The side panels 258 flex outward as the socket plate 252 is inserted into position. Engaging tabs 264 prevent the side panels 258 from flexing outward too far. Openings 264 in the socket cup 144 are provided for wiring to a light bulb socket (not shown). The light bulb socket is held in a socket holder, as will be described hereinafter, on the socket plate 252. The socket holder is supported by tabs extending through tab clearances 266 at a light bulb opening 268.

Figure 21:
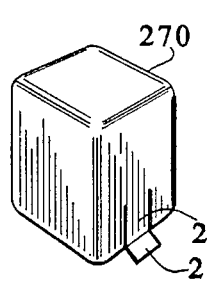
FIG. 21 is a perspective view of a socket holder.

In FIG. 21 is shown a socket holder 270 for engaging a socket that holds a light bulb in the present recessed light fixture. The socket holder 270 has a pair of tabs 272 on the lower side thereof that fit into the clearances 266 on the socket plate 252 as shown in FIG. 20. In the illustrated embodiment, the tabs 272 are on the free end of flexible arms 274 cut from the side of the socket holder 270. After the tabs 272 are inserted through the clearances 266 in the socket plate 252, the socket cup 270 is turned relative to the socket plate 252 so that the tabs 272 are no longer at the clearances 266 but are held by the light bulb opening 268 to hold the socket holder 270 securely on the socket plate 252 with the light socket held therein. The socket plate 252 is then inserted into the socket cup 144 and the socket cup 144 is mounted on the top of the reflector 142.

Figure 22:
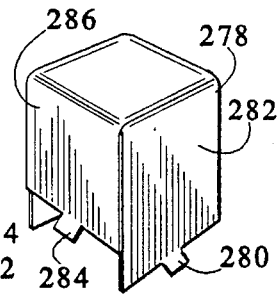
FIG. 22 is a perspective view of another socket holder.

In FIG. 22, a socket holder 278 has a pair of tabs 280 on opposed longer sides 282 and a second pair of tabs 284 on opposed shorter sides 286. First, the tabs 280 on the longer sides are inserted through the clearances 266 and then the socket holder is pushed downward to buckle the longer sides 282 outward as shown in FIG. 19 so that the tabs 284 may be inserted through the clearances 266. Of course, the socket holder 278 is turned relative to the socket plate 252 after insertion of the first tab pair 280 so that the tabs 284 are aligned with the clearances 266.

Figure 23:
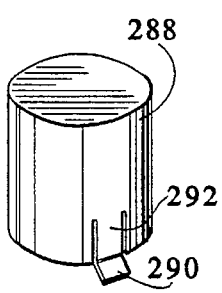
FIG. 23 is a perspective view yet another socket holder.

FIG. 23 shows another socket holder 288 that is of a round configuration and which has a tab 290 on an arm 292. The cylindrical socket holder 288 is used in place of the rectangular configured holders 270 and 278 as required by the shape of the bulb socket.

Figure 24:
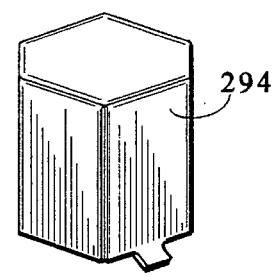
FIG. 24 is a perspective view of a further socket holder.

FIG. 24 shows another configuration of aa socket holder 294 of a hexagonal cross section as needed for the shape of the socket.

Figure 25:
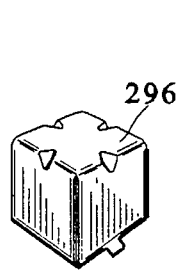
FIG. 25 is a perspective view of a yet a further socket holder.
Figure 26:
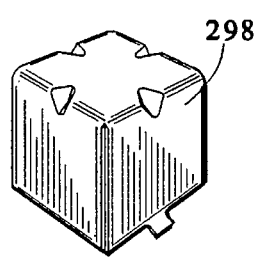
FIG. 26 is a perspective view of still another socket holder.
Figure 27:
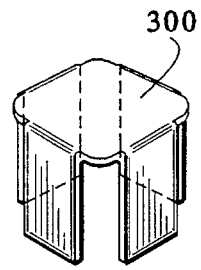
FIG. 27 is a perspective view of a spacer for a socket holder.
Figure 28:
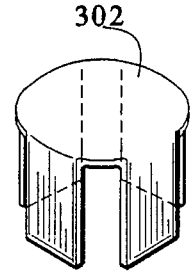
FIG. 28 is a perspective view of a further spacer for a socket holder.

In FIG. 25 is shown a small socket holder 296, which is used with a socket plate having a small bulb opening, while in FIG. 26 is shown a large socket holder 298. Spacers 300 and 302 are shown in FIGS. 27 and 28, respectively. The spacers 300 and 302 are used in the socket holders to support the bulb socket therein.

Although other modifications and changes may be suggested by those skilled in the art, it is the intention of the inventors to embody within the patent warranted hereon all changes and modifications as reasonably and properly come within the scope of their contribution to the art.

I claim:

1. A modular recessed light fixture, comprising:
   a plaster frame defining a major plane;
   a junction box mounted on said plaster frame, said junction box defining a first face;
   means for selectively attaching a junction face plate at said first face of said junction box, said means for selectively attaching comprises a recess in said plaster frame, said recess lying in said major plane; and
   a junction face plate selectively attachable at said first face by said means for selectively attaching, a tab on said junction face plate for selective insertion into said recess in said major plane of said plaster frame, said junction face plate including means for adapting said junction box to an installation configuration wherein said installation configuration comprises a component selected from the group comprising: a transformer, a thermal protector, a ballast and a conduit connector.

2. A modular recessed light fixture as claimed in claim 1, wherein said means for selectively attaching comprises a spring clip on said junction box for selectively engaging said junction face plate when said tab is in said recess.

3. A hanger bar for a recessed light fixture for mounting on a ceiling tile grid, comprising:
   an elongated shaft having first and second ends;
   an end mounting plate at said first end of said elongated shaft, said end mounting plate defining a clearance that is selectively positionable on a grid member of the ceiling tile grid,
   means for affixing said end mounting plate to a planar face of a ceiling joist, said means affixing being on said end mounting plate; and
   an extension on said mounting plate an said clearance, said extension engaging the grid member when said end mounting plate is moved from a first position to a second position relative to said elongated shaft, said end mounting plate being in said first position when generally at a right angle to said elongated shaft and said end mounting plate being in said second position when generally parallel to an axial direction of said elongated shaft, said means for affixing being in a position to mount on a planar face of a ceiling joist when in said first position and being in a position incapable of mounting on a planar face of a ceiling joist when in said second position.

4. A hanger bar as claimed in claim 3, further comprising:
   a bending location between said elongated shaft and said end mounting plate for bending said end mounting plate relative to said shaft.

5. A hanger bar for a recessed light fixture for mounting on a ceiling tile grid, comprising:
   an elongated shaft having first and second ends;
   an end mounting plate at said first end of said elongated shaft, said end mounting plate defining a clearance that is selectively positionable on a grid member of the ceiling tile grid, and
   an extension on said mounting plate at said clearance, said extension engaging the grid member when said end mounting plate is moved from a first position to a second position relative to said elongated shaft wherein said end mounting plate is in said first position when generally at a right angle to said elongated shaft and said end mounting plate is in said second position when generally parallel to an axial direction of said elongated shaft wherein said bending location defines an opening in said hanger bar between said shaft and said end mounting plate.

6. A hanger bar for a recessed light fixture for mounting on a ceiling tile grid, comprising:
   an elongated shaft having first and second ends;
   an end mounting plate at said first end of said elongated shaft, said end mounting plate defining a clearance that is selectively positionable on a grid member of the ceiling tile grid, and
   an extension on said mounting plate at said clearance, said extension engaging the grid member when said end mounting plate is moved from a first position to a second position relative to said elongated shaft wherein said end mounting plate is in said first position when generally at a right angle to said elongated shaft and said end mounting plate is in said second position when generally parallel to an axial direction of said elongated shaft wherein said end mounting plate is substantially symmetrical relative to an axis of said elongate shaft, said clearance being a first clearance, and further comprising:
   a second clearance defined in said end mounting plate at a position opposite said first clearance relative to said axis, said hanger bar being mountable with either of said first and second clearances on a member of a ceiling grid.

7. A recessed light fixture for mounting supporting a light reflector above an opening in a ceiling, comprising:
   an annular projection extending at a substantially right angle from said plaster frame for extending into the opening in the ceiling;
   means defining a plurality of slots in said plaster frame at intervals about said opening in said plaster frame;
   a trim ring for mounting at the opening in the ceiling, said trim ring having planar portion for mounting abutting the ceiling and parallel to a plane of the ceiling; and
   plurality of tabs extending from said trim ring in a direction perpendicular to said planar portion and perpendicular to the ceiling, said plurality of tabs corresponding in number and position to said plurality of slots so that said tabs are insertable through said slots, said tabs being capable of being bent over to hold said trim ring in position relative to said plaster frame, said tabs being insertable to an extent to accommodate different ceiling thicknesses.

8. A modular recessed lighting system for supporting a bulb and reflector at a ceiling opening, comprising:
   a plaster frame formed of sheet metal and defining a reflector opening for mounting in registration with the ceiling opening and at which the reflector is mounted;
   a junction box mounted on said plaster frame, said junction box defining a first face;
   means for selectively attaching a junction face plate at said first face of said junction box; and a junction face plate selectively attachable at said first face by said means for selectively attaching, said junction face plate including means for adapting said junction box to an installation configuration wherein said installation configuration comprises a component selected from the group comprising: a transformer, a thermal protector, a ballast and a conduit connector;

means for adjustable mounting hanger bars to said plaster frame;

hanger bars each having:
   an elongated shaft having first and second ends;
   an end mounting plate at said first end of said elongated shaft, said end mounting plate defining a clearance that is selectively positionable on a grid member of the ceiling tile grid, and
   an extension on said end mounting plate at said clearance, said extension engaging the grid member when said end mounting plate is moved from a first position to a second position relative to said elongated shaft;

means defining a plurality of slots in said plaster frame at intervals about said opening in said plaster frame;

a trim ring for mounting at the opening in the ceiling; and plurality of tabs extending from said trim ring, said plurality of tabs corresponding in number and position to said plurality of slots so that said tabs are insertable through said slots, said tabs being capable of being bent over to hold said trim ring in position relative to said plaster frame, said tabs being insertable to an extent to accommodate different ceiling thicknesses.

9. A junction box for use with a light fixture, comprising:

a box body having an open face;

a spring clip at a first side of said open face;

means defining a recess a second side of said open face, said second side being opposite to said first side;

a face plate selectively mountable on said open face, said face plate having a tab that is inserted into said recess when said face plate is mounted on said open face, said spring clip engaging said face plate when said face plate is mounted on said open face, said face plate defining an opening;

an auxiliary junction box mounted at said opening in said face plate, said auxiliary junction box having an open face for positioning in registration with said opening in said face plate, an engaging tab extending from adjacent a first end of said open face of said auxiliary junction box, said engaging tab being insertable through said opening in said face plate to hold said auxiliary junction box onto said face plate; and a fastener adjacent a second end of said open face of said auxiliary junction box, said second end being opposite said first end, said fastener extending into engagement with said face plate.

10. A recessed light fixture, comprising:

a plaster frame of sheet metal, a pair of louver-shaped openings formed in said plaster frame generally in a line with one another, an upwardly extending member on said plaster frame spaced from said louver-shaped openings and defining a clip receiving opening;

a ballast mounting plate having a lower edge,
   a pair of angled first legs on said lower edge arranged so as to be insertable into said louver-shaped openings,
   a second leg extending in a direction opposite said pair of angled first legs, said second leg bearing against a surface of said plaster frame when said first legs are inserted into said louver-shaped openings;

a clip on said ballast mounting plate, said clip engaging said clip receiving opening when said first legs are inserted into said louver-shaped openings to hold said ballast mounting plate on said plaster frame.

11. A recessed light fixture as claimed in claim 10, wherein said second leg is a pair of second legs space from one another.

12. A recessed light fixture as claimed in claim 11, wherein said clip is a pair of clips, each clip of said pair of clips being mounted on a corresponding one of said pair of second legs.

13. A recessed light fixture as claimed in claim 12, wherein said upwardly extending member comprises an upwardly formed perimeter of said plaster frame.

14. A recessed light fixture as claimed in claim 13, wherein said upwardly formed perimeter includes means for mounting hanger bars to said plaster frame, and further comprising:

hanger bars mounted on said plaster frame by said means for mounting, each of said hanger bars comprising:
   an elongated shaft;
   an end mounting plate having openings for receiving nails for attachment to a ceiling joist, said end mounting plate defining a clearance for receiving a grid member of a ceiling grid;
   an extension on said end mounting plate for engagement with the grid member when grid member is received in said clearance and said end mounting plate is moved to an engaging position, said engaging position said end mounting plate generally in axial alignment with said elongated shaft.

15. A recessed light fixture as claimed in claim 14, further comprising:

a bending location between said end mounting plate and said elongated shaft of said hanger bar, said bending location defining at least one opening in said hanger bar.

16. A recess light fixture as claimed in claim 14, wherein said end mounting plate defines first and second clearances for alternate engagement with grid members of ceiling grids, said first and second clearances being on opposite sides of said end mounting plate relative to an axis of said elongated shaft so that said hanger bar is mountable with either of said first and second clearances engaging the grid member.

* * * * *